United States Patent Office 2,864,736
Patented Dec. 16, 1958

2,864,736

METHODS OF COMBATTING FUNGI EMPLOYING THIOUREA SALTS OF SULFONIC ACIDS

Johannes Thomas Hackmann, Amsterdam, Netherlands, assignor to Shell Development Company, New York, N. Y., a corporation of Delaware No Drawing. Application August 12, 1954
Serial No. 449,489

Claims priority, application Austria August 21, 1953

7 Claims. (Cl. 167—22)

This invention relates to fungicidal compositions and to a method for controlling fungi on living plants. This invention comprises a new class of fungicidally active compositions which are suitable for use on living plant materials intended for human or animal consumption, and to a method for combatting fungi on such plant materials through the use of these new compositions. The new fungicides of the new class are stable and resistant to weathering and at the concentration levels necessary to effectively destroy fungi are substantially non-toxic, either to the plant material itself, or to mammals consuming such plant materials.

The new compositions comprise as their primary fungicidally active component one or more compounds which may be generically described as the salts of a S-hydrocarbyl substituted isothioureas with surface active acids. These compounds may be further described as the salts of compounds represented by the formula

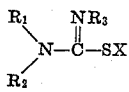

wherein $R_1$, $R_2$ and $R_3$ each represent the hydrogen atom or a hydrocarbyl group and X represents a hydrocarbyl group, with surface active acids.

It is preferred that the group represented by X be an alkyl group, of either straight-chain or branched-chain configuration, and having not more than about 14 carbon atoms, since it has been found that the fungicidal activity of the desired salts decreases substantially as the number of carbon atoms exceeds 14. Preferably, X contains not more than about 12 carbon atoms. A further preferred class of the compounds comprises those in which at least one of $R_1$, $R_2$, and $R_3$ represents a hydrogen atom and the remaining groups are selected from the class consisting of the hydrogen atom, the alkyl radicals and the carbocyclic radicals. It is even more preferable that these alkyl radicals contain not more than about 10 carbon atoms each, and that the carbocyclic radicals contain not more than about 16 carbon atoms each. A particularly desirable group of these compounds are those in which $R_1$, $R_2$ and $R_3$ are selected so that the sum of the carbon atoms contained in these three groups is not more than about 45.

The preparation of these salts is well known and details thereof will be familiar to those skilled in the art. Briefly described, the salts may be conveniently prepared by either of two general methods: (a) intimately contracting the isothiourea derivative with the surface active acid in the presence of a suitable inert solvent, such as a lower aliphatic alcohol or (b) intimately contacting a water soluble salt of the isothiourea, for example, the hydrochloric or hydrobromic acid salt, dissolved in water, with the alkali metal or ammonia salt of the surface active acid.

Examples of the S-hydrocarbyl isothiourea reactant include S-n-butylisothiourea, S-n-hexylisothiourea, S-n-octylisothiourea, S-2-ethylhexylisothiourea, S - nonylisothiourea, S-undecylisothiourea, S-tetratecylisothiourea, S-phenylethylisothiourea, S-phenylbutyl-isothiourea, N,N-dipropyl - N' - phenyl - S-butylisothiourea; N-methyl-N-phenyl-N'-n-hexyl-S-ethylisothiourea; N,N,N'-trimethyl-S-n-hexyl-isothiourea; N-phenyl-N,N'-dimethyl-S-ethylisothiourea; N,N,N'- trimethyl-S-n-decylisothiourea; N,N'-diisopropyl-N-methyl-S-amyl - isothiourea; N,N-diisobutyl-N'-phenyl-S-isopropylisothiourea; N,N,N'-trimethyl-S-(2-ethylhexyl) isothiourea; N,N-dimethyl-N' - cyclohexyl-S-ethylisothiourea; N,N,N'-triethyl - S - phenylisothiourea; N,N-dimethyl-N'-phenyl - S-(3,5,5,-trimethylhexyl)isothiourea; N,N-dimethyl-S-n-octyl - isothiourea, and N,N'-diphenyl-S-ethylisothiourea. A particularly desirable member of this group of compounds is S-alphanylisothiourea. By the term "alphanyl" is meant a mixture of long chain ($C_7$–$C_9$) alkyl radicals derived from a mixture of $C_7$–$C_9$ alcohols commercially available under the trade name "Alphanol" and which has the approximate composition:

| | Percent |
|---|---|
| n-Heptanol (plus 2-methylhexanol-1) | 45 |
| n-Octanol (plus 2-methylheptanol-1) | 43 |
| n-Nonanol (plus 2-methyloctanol-1) | 12 |

The fungicidally-active compounds are the salts of "surface active acids." By this term is meant those acids which themselves, or as their alkali metal salts, modify substantially the characteristics of the interfacial boundary between two phases, one of which phases is a liquid. Such acids and their various salts or esters are classed as anionic surface active agents in which a hydrocarbon radical of hydrophilic nature characterized by weak residual valence forces is attached directly to a hydrocarbon radical of hydrophobic nature characterized by strong residual or secondary valence forces. The ionogenic component of such acids are generally one of the carboxyl group (—COOH), the sulfonic acid group (—$SO_3H$) or the sulfuric acid group (—$OSO_3H$) and the hydrophilic group is generally a hydrocarbon group containing at least 7 carbon atoms and preferably from about 10 to about 40 carbon atoms.

Suitable as the hydrophilic group are such radicals as the long-chain hydrocarbon radicals, both saturated and unsaturated and of either straight-chain or branched-chain configuration and preferably containing at least 8 carbon atoms. Typical examples of this class include the straight-chain and branched-chain alkyl and alkylene groups derived from fatty acids, such as the lauryl group, the oleyl group, the linoleyl group, the stearyl group, the ricinoleyl group, like groups and their isomers.

Also suitable as the hydrophilic group are the hydrocarbon groups containing carbocyclic ring structures, such as aromatic groups, hydrocarbon-substituted aromatic groups, aromatic substituted aliphatic hydrocarbon groups, and the cycloaliphatic counterparts of these groups. Especially suitable are polynuclear aromatic groups and higher alkyl-substituted aromatic groups. Typical examples are the higher alkyl substituted phenyl groups such as the octyl phenyl group, dodecyl-phenyl group and the like, aliphatic groups such as those hereinbefore described which have been substituted by one or more aromatic or cyclo-aliphatic groups, such as the hydrocarbon groups derived from naphthenic acids, wool fat acids and the like.

Examples of the surface active acids include the aromatic sulfonic acids, especially those containing more than about 12 carbon atoms: dodecylbenzene sulfonic acid, oil-soluble petroleum sulfonic acids, cetylbenzene sulfonic acid, cetylphenol sulfonic acid, nonylbenzene sulfonic acid, cetylnaphthalene sulfonic acid, and the like. Also included are the aromatic carboxylic acids, especially those containing more than about 12 carbon atoms, such as the alkyl substituted benzoic acids, corresponding to the sulfonic acids described above, the bile acids, such as cholic acid, and the rosin acids, such as abietic acid and the resin acids derived from tall oil. A further group comprises the carboxylic acids containing both aromatic and aliphatic components, as in the acids derived from lanolin, such as cholesteryl and isocholesteryl esters of long chain fatty acids, commonly known as wool fat acids. The naphthenic acids, which are saturated monocarboxylic acids containing alkyl-substituted cycloalkane rings (especially $C_5$ and $C_6$ rings) having high molecular weights, are also suitable, as are the aliphatic carboxylic acids, sulfonic acids and sulfate acids. The aliphatic carboxylic acids include those commonly characterized as the naturally occurring fatty acids containing from about 8 to about 20 carbon atoms per molecule derived from natural oils, waxes and so on. These acids may be of either branched chain or straight-chain configuration, may be either saturated or unsaturated and may contain hydroxyl substituent groups and are exemplified by stearic, palmitic, oleic and recinoleic acids. Also included within this group are the fatty acids, synthesized from the various waxes, such as paraffin wax, scale wax, wax from low temperature hydrogenation of lignite and wax produced by the Fischer-Tropsch process. The sulfonated acids are obtained by the sulfonation of hydroxy-substituted fatty acids, of naturally occurring fatty alcohols such as the natural waxes, etc. Examples include the sulfonated esters of butyl oleate, the sulfonated acids derived by the oxidation of such natural products as lanolin, olive oil, castor oil, tallow, cottonseed oil and the like. The sulfate acids are obtained by the sulfation of primary fatty alcohols containing from about 8 to about 18 carbon atoms per molecule, such as cetyl alcohol, oleyl alcohol, myristyl alcohol and the like, or by the sulfation of olefins, such as those obtained by the Oxo-process.

Typical examples of these fungicidally active compounds thus include the salt of S-alphanylisothiourea with dodecylbenzene sulfonic acid, the wool fat acid of S-decylisothiourea, the dodecylbenzene sulfonic acid salts of N,N,N'-trimethyl-S-n-hexylisothiourea and N,N'-dimethyl-S-ethylisothiourea, respectively, the abietic acid salt (resin acid salt) of N-ethyl-S-decylisothiourea, the naphthenic acid salt of S-3,5,5-trimethylhexylisothiourea and the "Teepol" salt of S-decylisothiourea. "Teepol" is the trade name of a commercial product comprising a mixture of sodium naphtha sulfonates soluble in oil and sodium salts of sulfuric acid monoesters of secondary alcohols.

The salts of the present invention can be used alone or in combination with other fungicidal, viricidal, insecticidal or acaricidal materials, the action of which may be either internal or external, with plant nutritives, with plant hormones, and the like. Wetting agents and, if necessary or desirable, stickers such as the heavy hydrocarbon oils with a minimum viscosity of 10° Engler at 50° C. can be present. Any conventional wetting agent, for example, alkyl sulfate salts, alkyl aryl sulfonate salts, sulfosuccinate salts, ethers from polyethylene glycols and alkylated phenols, and the like can be employed. If the toxic agents are employed in the form of emulsions or suspensions, for example, in water, solvents such as oils, emulsifiers, emulsion stabilizers, and the like can be added. Materials which suppress the phytotoxic action of the fungicides, thereby making it possible to utilize unusually high dosages of the fungicidal material, can also be present. For example, glucose is known to protect tomato plants against damage by certain substances having a phytotoxic effect when in concentrated form, such as urea.

The present salts are preferably applied to plants by means of spraying. Spraying of the plants to be treated is preferably performed with aqueous emulsions or suspensions of the active agents. Aqueous emulsions or suspensions containing from about 0.01 to about 1% by weight, and preferably from about 0.05 to about 0.5% by weight, of the active agent are particularly suitable. The spray liquid is generally applied at a rate of from about 75 to about 150 gallons per acre. If spraying is effected with much smaller quantities of liquid as in low volume spraying, higher concentrations of the active agents should be employed. If desired, a minor amount, of the order of from about 0.01 to about 0.05% by weight, of a wetting agent can be added to aid in forming a suspension of the salt in the aqueous medium. Any of the conventional wetting agents, such as those mentioned above, can be employed. Particularly suitable wetting agents are the sodium salt of a mixture of secondary heptadecyl sulfates, sold commercially under the name of "Teepol" and polyethylene glycol ethers of alkyl phenols sold under the trade name of "Triton X–100" and "Triton X–155." Preferably, concentrate compositions comprising the active salt of the present invention and a suitable wetting agent are prepared, and the concentrate is then dispersed in water just prior to use.

A further form in which the fungicidal compounds may be applied consists of solutions of the active ingredient in suitable inert liquid or semi-solid diluents in which the active ingredient is present in molecularly dispersed form. The form in which the agents to be employed are applied to the object treated depends on the nature of the object and the purpose of the application.

Suitable inert solvents for the manufacture of liquid preparations should not be readily inflammable, as odorless as possible and without any toxic effect on humans and animals when properly used. Neither should they have a corrosive effect on the components of the preparations or the material of the storage vessel. Examples of suitable solvents are high-boiling oils, e. g., oils of vegetable origin such as castor oil, etc., and lower-boiling solvents with a flash point of at least 30° C., such as carbon tetrachloride, ethylene dichloride, ethane tetrachloride, hydrated naphthalene, alkylated naphthalene, solvent naphtha, etc. Mixtures of solvents may, of course, also be used.

The present salts can also be applied to plants in the form of dusts, utilizing as the inert vehicle such materials as tricalcium phosphate, precipitated chalk, bentonite, kaolin, kieselguhr, etc., but cork powder, wood powder and the like may also be used. In these cases it is advisable to add wetting agents.

The active substances in question may also be used in the form of aerosols. For this purpose the active ingredient must be dissolved or dispersed in a solvent boiling below room temperature at atmospheric pressure.

The invention is illustrated by the following examples which are not to be considered as limiting the specification and claims in any manner.

In Examples I, II and III, the effectiveness of the novel compounds are compared to that of fungicides widely used commercially, and the result reported as the "relative degree of suppression" of the fungus. The relative degree of suppression was determined by the following method.

Test plants were sprayed with an aqueous solution of the active salt until the liquid dropped from the leaves. After the spray liquid dried, usually after about two days, the plants were exposed to contamination with the fungus. Depending on the kind of test plant and of the fungus, contamination was effected either by inoculation of the plant or by placing the plant in contaminated surroundings, for example, in a greenhouse in which plants affected by the fungus were present. Conditions were chosen such that the untreated plants soon became diseased. After a certain period had elapsed, depending on the plant tested, the ratio of the affected leaf surface to the total leaf surface was determined for both the treated and the untreated plants. The quantity obtained by subtracting the quotient of these two numbers from one is a measure for the degree to which suppression of the fungus has succeeded, i. e., the relative degree of suppression is expressed as $$\frac{\text{The degree of suppression obtained with the active substance to be used according to the invention}}{\text{The degree of suppression obtained with the standard substance}} \times 100$$

Hereinafter, this quantity, expressed in percent, will be termed the degree of suppression. The degree of suppression was determined at a time at which the untreated plants showed clear symptoms of the disease. As a rule, the leaf surfaces were not measured, but estimated with the required accuracy. An experienced person can in this way determine the degree of suppression with an accuracy of about 5%.

In this way a value is obtained which is as accurate as possible for the active substance in question, the absolute degree of suppression depending on the degree of infection. In every case the substances to be used according to the invention were compared with usual concentrations of preparations in commercial use for controlling the corresponding diseases.

EXAMPLE I

The dodecylbenzene sulfonates of S-alphanylisothiourea, N,N,N' - trimethyl - S - n - hexylisothiourea and N,N-dimethyl-S-ethylisothiourea, in the form of aqueous emulsions of their solutions in hydrocarbon oils in various concentrations were sprayed on potatoes, tomatoes and various cereal grains, which had been injected with phytophthora or septoria and mildew, respectively. For purposes of comparison, other plants, also injected with these fungi, were sprayed with Koneprox, a commercial preparation in normal present day use as a fungicide, which contains copper oxychloride as the active component. In each of the tests the concentration of Koneprox in the spray was that used commercially for controlling the particular fungus on the particular plant material.

Table I

| Dodecylbenzene Sulphonate of— | Concentrate in percent w. | Disease | Plant | Rel. Degree of Suppression [a] | Degree of infection |
|---|---|---|---|---|---|
| S-alphanylisothiourea | 0.05 | mildew | cereals | 100 | normal. |
|  | 0.05 | phytophthora. | tomatoes | 426 | heavy. |
|  | 0.1 | do | potatoes | 165 | medium. |
| N,N,N'-trimethyl-S-hexyl-isothiourea. | 0.05 | mildew | cereals | 110 | normal. |
|  | 0.2 | septoria | celery | 230 | heavy. |
|  | 0.05 | mildew | cereals | 108 | normal. |
| N,N-dimethyl-S-octylisothiourea. | 0.05 | phytophthora. | tomatoes | 836 | very heavy. |
|  | 0.1 | do | potatoes | 124 | medium. |

[a] Standard of comparison=Koneprox 0.5% by weight.

From the above results it can be clearly seen that especially where there is heavy infection the substances to be used according to the invention are particularly effective.

EXAMPLE II

The relative degree of suppression of phytophthora and septoria on several vegetables by the "Teepol" salt of S-decylisothiourea on plants of various kinds ("Teepol" is the trade-name of a mixture of sodium naphtha sulphonates soluble in oil and mixtures of sodium salts of sulfuric acid monoesters of secondary alcohols). The results are shown in the table below.

Table II

| Concentration in percent w. | Plant | Disease | Relative degree of Suppression [a] |
|---|---|---|---|
| 0.05 | tomatoes | phytophthora | 664 |
| 0.1 | potatoes | do | 171 |
| 0.2 | celery | septoria | 170 |

[a] Standard of comparison: Koneprox, 0.5% by weight.

EXAMPLE III

With the wool fat acid salt of S-decylisothiourea in a 0.2% by weight concentration a relative degree of suppression of 115 was obtained against septoria on celery, the standard of comparison being Koneprox, 0.5% by weight.

EXAMPLE IV

The activity against Phytophthora infestans on tomatoes and potatoes of various salts of S-alphanylisothiourea was compared with the effect of Dithane in a spray conc. of 0.2%. The results are shown in Table III.

Table III

| Salt of S-Alphanyl-isothiourea with— | Phytophthora infestans on— | | | |
|---|---|---|---|---|
| | Tomatoes | | Potatoes | |
| | Conc.[a] Used | Percent Control/Percent Control with Dithane 0.2% | Conc. Used | Percent Control/Percent Control with Dithane 0.2% |
| Dodecylbenzenesulphonic acid | 0.1 | 0.9 | 0.1 | 0.9 |
| Abietic acid | 0.1 | 0.5 | 0.1 | 0.8 |

[a] All products formulated as 10% wettable powder, containing 85% bentonite and 5% sulfite lye.

EXAMPLE V

The dodecylbenzene sulfonic acid salts of (A) alphanylisothiourea and (B) S-decylisothiourea were compared (in the form of wettable powders) to two commercial fungicides, Dithane and Koneprox (active ingredient—copper oxychloride) both of which were also in the form of wettable powders.

The results are shown in Table IV.

Table IV

| Fungicide | Phytophthora on Tomatoes (Concentration of Active Material in Percent Comparable with—) | | Altervaria on Tomatoes (Concentration of Active Material in Percent Comparable with—) | |
|---|---|---|---|---|
| | Dithane, 0.2-0.24% | Koneprox, 0.5% | Dithane, 0.2-0.24% | Koneprox, 0.5% |
| (A) | 0.1 | 0.1 | 0.1 | 0.15-0.2 |
| (B) | 0.1 | 0.1 | 0.1 | 0.1 |

EXAMPLE VI

The S-alphanylisothiourea salt of dodecylbenzenesulfonic acid (A) was compared to Koneprox and Dithane in the treatment of potato plants infested with phytophthora.

In this test, spraying was begun as soon as the first plants emerged from the soil. The spraying schedule is tabulated in Table V. The results of the tests are reported as the "percent attack," or the estimated percent defoliation caused by the fungus. In Table V, zero date indicates the date on which spraying was started.

Table V

| Product and Concentration | Date of Spraying and Percent Attack (Days) | | | | | | | | | |
|---|---|---|---|---|---|---|---|---|---|---|
| | 0-22 a | 29 | 31 b | 37 | 43 b | 49 | 50 b | 56 | 59 | 64 |
| A—0.15% in emulsible oil | | 0 | | 0 | | 0.4 | 1.3 | 1.2 | 1.6 | 12.5 |
| A—0.2% in emulsible oil | | 0 | | 0 | | 0 | 0.7 | 0.7 | 1.3 | 7.4 |
| Koneprox, 0.75% | | 0 | | 0 | | 0 | 0 | 3 | 6.9 | 10.9 |
| Dithane, 0.2% | | 0 | | 0 | | 0 | 0 | 0.7 | 2.7 | 9.3 |
| Untreated | | 5.2 | | 5.2 | | 51 | 58.2 | 87.5 | 93.5 | 93.5 | a Spraying done every three days.
b Spraying.

EXAMPLE VII

The lack of mammalian toxicity of the S-alphanylisothiourea salt of dodecylbenzenesulfonic acid is shown by the following data:

Two rabbits were fed daily with 0.5 kilogram of mangolds to which 100 milligrams of the salt had been added. The total weight of the rabbits was about 3200 grams at the beginning and about 3400 grams at the end of the experiment. Dosage: about 30 milligrams' fungicide per kilogram of body weight. The test lasted for 24 days. The rabbits were not visibly affected by the fungicide.

At the end of 24 days, addition of the fungicide was halted. Fourteen days later, fungicide was again added, in an amount equal to ten times the previous dosage. This experiment continued for 14 days. No adverse effects were observed.

I claim as my invention:

1. The method of protecting plants from destruction by fungi which comprises treating plants with a fungicidal toxic amount of the N,N,N'-trimethyl-S-n-hexylisothiourea salt of dodecylbenzenesulfonic acid.

2. The method of protecting plants from destruction by fungi which comprises treating plants with a fungicidal toxic amount of the N,N-dimethyl-S-ethylisothiourea salt of dodecylbenzenesulfonic acid.

3. The method of protecting plants from destruction by fungi which comprises treating plants with a fungicidal toxic amount of the S-decylisothiourea salt of wool fat acid.

4. The method of protecting plants from destruction by fungi which comprises treating the plants with a fungicidal toxic amount of an S-alkylisothiourea salt in which the alkyl group contains from 1 to 14 carbon atoms of a monocarboxylic acid containing at least 8 carbon atoms but not more than 20 carbon atoms per molecule.

5. The method of protecting plants from destruction by fungi which comprises treating said plants with a fungicidal toxic amount of an S-alkylisothiourea salt in which the alkyl group contains from 7 to 9 carbon atoms of dodecylbenzenesulfonic acid.

6. The method of protecting plants from destruction by fungi which comprises treating said plants with a fungicidal toxic amount of an S-alkylisothiourea salt in which the alkyl group contains 1 to 14 carbon atoms of an alkylated benzenesulfonic acid having from 12 to 26 carbon atoms.

7. The method of protecting plants from destruction by fungi which comprises treating said plants with a fungicidal toxic amount of an S-alkylthiourea salt in which the alkyl group contains from 1 to 14 carbon atoms of an acid selected from the group consisting of alkylated benzene, naphthalene and phenol sulfonic acids and oil-soluble petroleum sulfonic acids having from 12 to 26 carbon atoms, monocarboxylic acids having from 8 to 26 carbon atoms, and aliphatic monosulfate acids having from 8 to 18 carbon atoms.

References Cited in the file of this patent

UNITED STATES PATENTS

| | | |
|---|---|---|
| 2,156,193 | Puetzer | Apr. 25, 1939 |
| 2,347,966 | Roblin | May 2, 1944 |

OTHER REFERENCES

Bandelin: Jour. of the Am. Chem. Soc., vol. 74, 1952, pp. 4271–4273.

Klamann: Chem. Abst., vol. 47, March 25, 1953, p. 2707.